2 Sheets—Sheet 1.
T. A. WARRINGTON & C. HARWOOD.
Machine for Cutting Cork.
No. 197,189.      Patented Nov. 13, 1877.
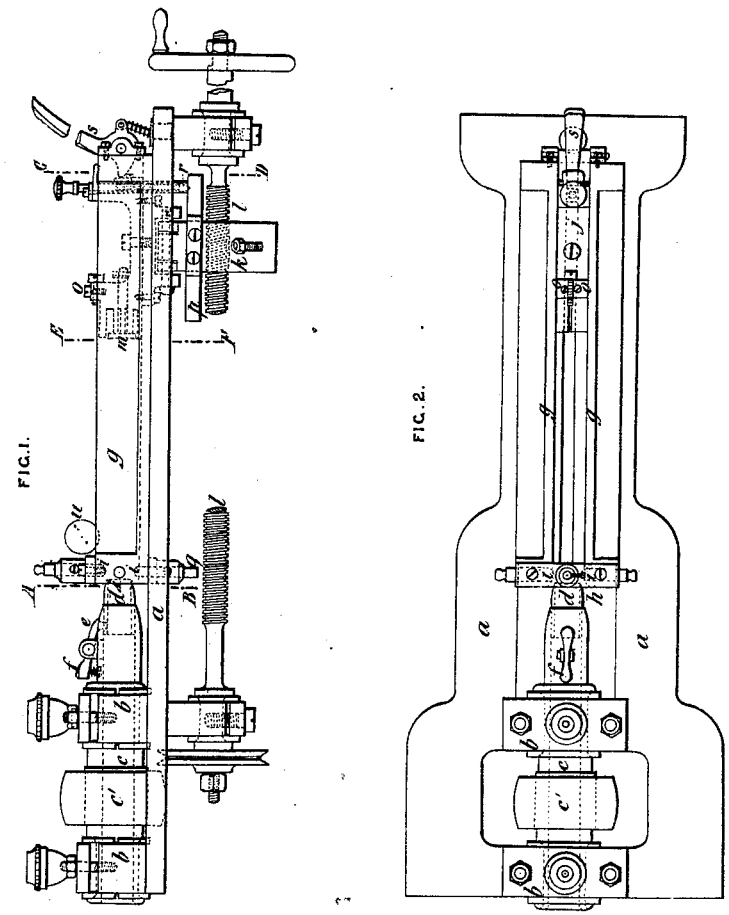

2 Sheets—Sheet 2.
T. A. WARRINGTON & C. HARWOOD.
Machine for Cutting Cork.
No. 197,189.  Patented Nov. 13, 1877.
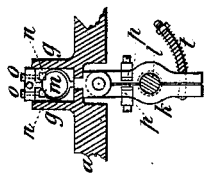
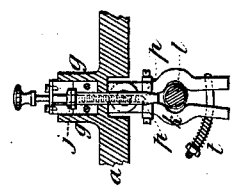
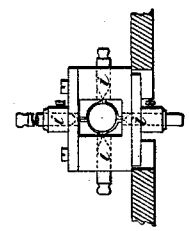

UNITED STATES PATENT OFFICE.

THOMAS A. WARRINGTON AND CHARLES HARWOOD, OF LONDON, ENGLAND; SAID HARWOOD ASSIGNOR TO SAID WARRINGTON.

IMPROVEMENT IN MACHINES FOR CUTTING CORK.

Specification forming part of Letters Patent No. 197,189, dated November 13, 1877; application filed May 22, 1877.

*To all whom it may concern:*

Be it known that we, THOMAS ALFRED WARRINGTON and CHARLES HARWOOD, both of London, England, have invented new and useful Improvements in Machinery or Apparatus for Cutting Cork and other like substances, which improvements are fully set forth in the following specification, reference being had to the accompanying drawing.

This invention has for its object certain improvements in machinery or apparatus for cutting cork and other like substances with greater facility than heretofore.

In carrying our said invention into practice, we construct a machine as shown in the accompanying drawing, which we will now proceed to describe.

In the said drawing, Figure 1 is a side elevation of the said machine. Fig. 2 is a plan of the same. Fig. 3 is a section on the line A B, Fig. 4 is a section on the line C D, and Fig. 5 a section on the line E F, Fig. 1.

Like letters indicate the same parts throughout the drawing.

We construct our said machine with a bed-plate, $a$, of cast-iron or other suitable material, and having on its upper surface, at one end, two bearings, $b\ b$, for a hollow spindle, $c$. The said spindle rotates freely in these bearings, and is driven by a belt passed over a pulley, $c'$, and this rotary motion is imparted to the cutting-tool $d$, carried in the end of the said spindle. The said cutting-tool is held in its place in the hollow spindle $c$ by a small catch, $e$, which is opened and closed by a trigger, $f$.

Pieces of metal $g$ are cast on or attached to the middle of the bed-plate $a$ on its upper surface, to act as guides to the "quarters," or pieces of cork to be operated upon by the cutter, the center of the said guides being in a line with the center of the cutting-tool $d$.

The end of the guide nearest the spindle and cutting-tool is enlarged at $h$, to allow a free passage for the escape of the débris of the cork as it is cut away. At the same end of the guide we fix one or any number of small blades, $i$, for the purpose of splitting the part of the cork cut away into separate pieces, thereby preventing undue friction on the spindle and cutting-tool.

The quarters, or pieces of cork of the requisite dimensions, are placed in the guide, and the piece of cork being cut may be held down by means of a roller, $u$, forced against it by a spiral spring. The said pieces are advanced by means of a sliding head, $j$, fitted with a split nut, $k$, which grasps a screw, $l$, situated slightly below the bed-plate.

The sliding head $j$ is constructed to receive the end of the cutter $d$, and is fitted with a rotating disk, $m$. This disk, when the cut is completed, forces the end of the cork out into the cutter, and revolves with it. The sliding head $j$ is also fitted with stones or other sharpeners $n$, regulated or adjusted by set-screws $o$, for sharpening the cutter $d$ without removing it from the hollow spindle.

To keep the sliding head from feeding too far forward, and thereby breaking the machine, the said split nut is provided with projecting pieces $p$, which, coming into contact with a pin, $q$, fixed to the under side of the bed-plate below the cutting-tool, cause the nut to open and stop the feed at the moment the cut is completed. At the same instant a pin or wedge, $r$, drops between the two pieces, and keeps them and the split nut apart. The head is then free to be drawn back by the operator. The guide being again filled, the pin or wedge is raised by a lever, $s$, the jaws or split nut are brought together by means of a spring, $t$, and the feed continued by the feed-screw, as before.

We claim—

1. In a cork-cutting machine, the combination, with the spindle and the cutter $d$, of the knives $i$, constructed and arranged substantially as described and shown.

2. The combination, with the sliding head $j$ and screw $l$, of the split nut $k$, the parts of which are hinged together, and the bolt and spring $t$, for holding the said parts in position, constructed and arranged substantially as described and shown.

3. The combination, with the sliding head

*j*, of the stones or other sharpeners *n*, secured thereto, and the adjusting-screws *o*, for sharpening the cutter when the head is brought into contact with the same, constructed and arranged substantially as described and shown.

4. The guide or guides *g*, the knives or blades *i*, and the slide or sliding head *j*, with its adjuncts, combined and operating as above described, and for the purposes specified.

THOS. A. WARRINGTON.
CHARLES HARWOOD.

Witnesses:
ROWLAND GEO. BROWN,
RICHARD HALLAM.